350-385 SR

XR 4,042,814

United States Patent [19]

Taylor

[11] 4,042,814

[45] Aug. 16, 1977

[54] ELECTRO-OPTIC BINARY ADDER

[75] Inventor: Henry F. Taylor, San Diego, Calif.

[73] Assignee: The United States of America as represented by the Secretary of the Navy, Washington, D.C.

[21] Appl. No.: 700,683

[22] Filed: June 28, 1976

[51] Int. Cl.[2] .................... G06F 7/56

[52] U.S. Cl. .................... 235/175; 350/150

[58] Field of Search .................... 235/175, 152; 350/150

[56] References Cited

U.S. PATENT DOCUMENTS

| | | | |
|---|---|---|---|
| 3,270,187 | 8/1966 | Fomenko | 235/152 |
| 3,466,433 | 9/1969 | Duda et al. | 235/175 |
| 3,680,080 | 7/1972 | Maure | 235/152 X |
| 3,903,400 | 9/1975 | Nisenson | 350/150 X |

*Primary Examiner*—Jerry Smith

*Attorney, Agent, or Firm*—R. S. Sciascia; G. J. Rubens; J. W. McLaren

[57] ABSTRACT

A common substrate supports a plurality of waveguides numbering one more than the number of bits in the binary addends to be summed. Linearly polarized light is transmitted along each of the waveguides and a plurality of electrodes connectable to an electrical potential representative of a binary bit. The electrodes have discrete lengths contiguous to the waveguides for causing $\pi$-radian phase retardation of light propagation upon application of the electrical potential. A polarization separator receives the output of each waveguide and produces signals commensurate with orthogonally polarized components. Photo detectors responsive to the signals representing each of the components produce commensurate electrical output signals which are, in turn, amplified and compared in an analog comparator for producing a binary output signal representative of the relative amplitudes of each pair of signals representing the orthogonally polarized components in each of the waveguides.

9 Claims, 2 Drawing Figures

ELECTRO-OPTIC BINARY ADDER

BACKGROUND OF THE INVENTION

Basic addition operations performed in a computer follow the rules of binary arithmetic. Additon is the operation in which one number, an addend, is combined with a second number or addend (which may also be known as an augend) to form a sum.

One technique for performing the addition operation uses a binar counter to arrive at the results of the sum. In employing this technique a number of pulses equivalent ot one of the numbers are counted first and then the counter continues by counting a series of pulses equal to the other number. Upon the completion of both these counts, the number in the counter is the total number of pulses that were sensed, or the sum of the two numbers. This method is relatively slow, however, and also requires extensive, comparatively complex equipment. True arithmetic computation of binary members is much faster, uses less equipment, and simplifies the handling of binary data.

For example, binary addition if performed in much the same manner as ordinary decimal addition and follows three rules, i.e., a binary 0 and a binary 0 produces the sum of a binary 0; a binary 1 and a binary 0 produces the sum of a binary 1; and, a binary 1 added to a binary 1 produces a sum of a binary 10 (or 0 and carry 1).

For example, a decimal number 13 added to the decimal number four = decimal 17. In the binary arithmetic addition, the decimal number thirteen is expressed binarily as 1101, while the decimal number four is expressed binarily as 100.

These binary numerical expressions are combined arithmetically to produce the resultant binary sum as follows: the 0 order digits i.e., the digits of least significance, are combined or added arithmetically to form a sum of a binary 1 in accordance with the foregoing rules of binary addition; the first order digits are then combined or summed arithmetically to arrive at the resultant sum of a binary 0 in accordance with the foregoing rules of binary addition; the second order digits are combined or summed in similar manner to form the resultant sum of a binary 10, or "0 and carry the 1"; the third order digits are then combined with the carry from the second order to form the sum of a binary 10. This operation may be expressed as,

| | | | | |
|---|---|---|---|---|
| Carry: | 1 ← | | | |
| | 1 | 1 | 0 | 1 |
| | + | 1 | 0 | 0 |
| | 10 | 0 | 0 | 1 |

Since the decimal equivalent of the binary expression 10001 is $$
\begin{aligned}
1 \times 2^4 &= 1 \times 16 = 16 \\
0 \times 2^3 &= 0 \times 8 = 0 \\
0 \times 2^2 &= 0 \times 4 = 0 \\
0 \times 2^1 &= 0 \times 2 = 0 \\
1 \times 2^0 &= 1 \times 1 = \underline{1} \\
& \quad\quad\quad\quad\;\; 17
\end{aligned}
$$

it has been demonstrated that the binary sum is the same as the decimal sum, $$
\begin{array}{r} 13 \\ \underline{+4} \\ 17 \end{array}
$$

To implement the binary sum and carry process electronically, it is necessary to transform the rules for binary addition into logic equations and then develop a logic design and fabricate a logic circuit which satisfies the logic equations. In implementing such logic equations, AND, OR, and NOT operations are performed by electronic logic gates. To perform the complete addition of one binary bit, a logic circuit must add three inputs, the augend, the addend, and the carry from the previous order. This requires what is known as a "full adder."

Such "full adders" may take a number of different forms. Generally speaking, however, such full adders are relatively complex and moreover involve time-consuming sequential operations rather than simultaneous operations. For example, one type of full adder requires a level switch, seven AND gates, three NAND gates, and two OR gates, for a total of one switch and twelve gates to effect the addition of two binary bits. Another type of full adder requires one level switch, four AND gates, two NAND gates, and three OR gates, for a total of one switch and nine gates to complete the addition of two binary bits. Yet another type of full adder requires one level switch, five AND gates, three OR gates, and one NAND gate for a total of one switch and nine gates to add two binary bits.

Moreover, each of these full adders requires a minimum of four sequential operations to perform its function, thus severly limiting the speed of operation, [as discussed in considerably more detail in the text entitled "Digital Logic and Computer Operations" by Baron and Piccirilli, published by McGraw-Hill Book Company in 1967.]

Accordingly, there is a need for a technique and means for adding binary numbers which does not involve the multiplicity of gates employed in conventional logic circuitry, nor depend upon time-consuming, speed-limiting, sequential functions which are inherent in the gate operations of such conventional logic circuitry.

SUMMARY OF THE INVENTION

The present invention contemplates an electro-optic adder which eliminates the requirement for serial logic operations in adding binary bits and greatly reduces the number of sequential steps needed to add numbers of high precision. The electro-optic adder of the present invention may comprise an array of identical channel waveguides which may be supported on a single crystal substrate. The substrate is preferably of linear electro optical material of the "Pockels" type. Each waveguide is designed and fabricated to support one predominately TE and one predominately TM guided mode of propagation; each of the plurality of optical waveguides is excited by linearly polarized light from a suitable light energy source such as a continous wave laser, for example.

Electrodes are disposed so as to have discrete lengths contigous to the waveguides for impressing electric fields thereacross. When impressed across the waveguides, the electric fields induce an electro optic phase retardation therein and each of the total of 2N electrodes corresponds to a particular binary digit in one of the addends to be summed.

The magnitude of the voltage applied to an electrode is 0, i.e., ground potential for a binary 0, and $V_0$ for a binary 1. The sign of the voltage is chosen such that all the electro-optic phase changes in a particular waveguide have the same sense, i.e., are additive. The electrodes are arranged as to length relative to each waveguide so that the electro-optic interaction region for each waveguide is the length required for a $\pi$-radian phase retardation with an applied voltage $V_0$.

The total phase retardation for light emerging from any waveguide may therefore be determinaby predicted. The light emerging from each waveguide is passed through a suitable polarization separator such as for instance, a Rochon or Wollaston prism and the intensities of the orthogonally polarized components produced by such polarization separation are detected independently.

The signals corresponding to the polarized components may be suitably amplified and compared in an analog comparator which produces a binary output i.e., a binary 1 or a binary 0 representative of the relative intensity of its received signals. This binary output of the analog comparator is the binary summation of the addends which were binarily represented by the potentials impressed upon the electrodes of the device.

Accordingly, a primary object of the present invention is to provide an improved adder for summing binary addends which is not inherently dependent upon time-limiting, sequential operations.

Another most important object of the present invention is to provide an electro-optic adder for summing binary addends which significantly reduces the number of component elements required for its efficient functioning.

A further most important object of the present invention is to provide an improved adder for summing binary addends which may be fabricated by the most advanced integrated electro-optic techniques.

These and other features, objects, and advantages of the present invention will be better appreciated from an understanding of the operative priciples of a preferred embodiment as described herinafter and as illustrated in the accompanying drawings.

DESCRIPTION OF THE PREFERRED EMBODIMENT

The electro-optic binary adder of the present invention employs a simple relationship for calculating a sum $C = A + B$. The $N$-bit addends $A$ and $B$ may be represented in binary code by $$A = a_N \ldots a_1$$

$$B = b_S \ldots b_1$$

and their sum may be represented by, $$C = c_{N+1} c_N \ldots c_1$$

where the $a_n$s, $b_n$s, and $c_n$s are binary digits. Quantities $\zeta_j = 1 \ldots, N+1$, are defined by the relations $$\zeta_1 = a_1 + b_1$$

$$\zeta_2 = a_2 + b_2 + (a_1 + b_1)/2$$

and in general, $$\zeta_j = \sum_{n=1}^{j} (a_n + b_n) 2^{n-j} \qquad (1)$$

A binary representation of the sum can be generated from computed values of the $\iota_j$s according to the following relationships:

$$c_j = 0 \text{ if } 0 \leqq \zeta_j < 1 \text{ or } 2 \leqq \zeta_j < 3$$

$$c_j = 1 \text{ if } 1 \leqq \zeta_j < 2 \text{ or } 3 \leqq \zeta_j \ldots \qquad (2)$$

Figure 1:
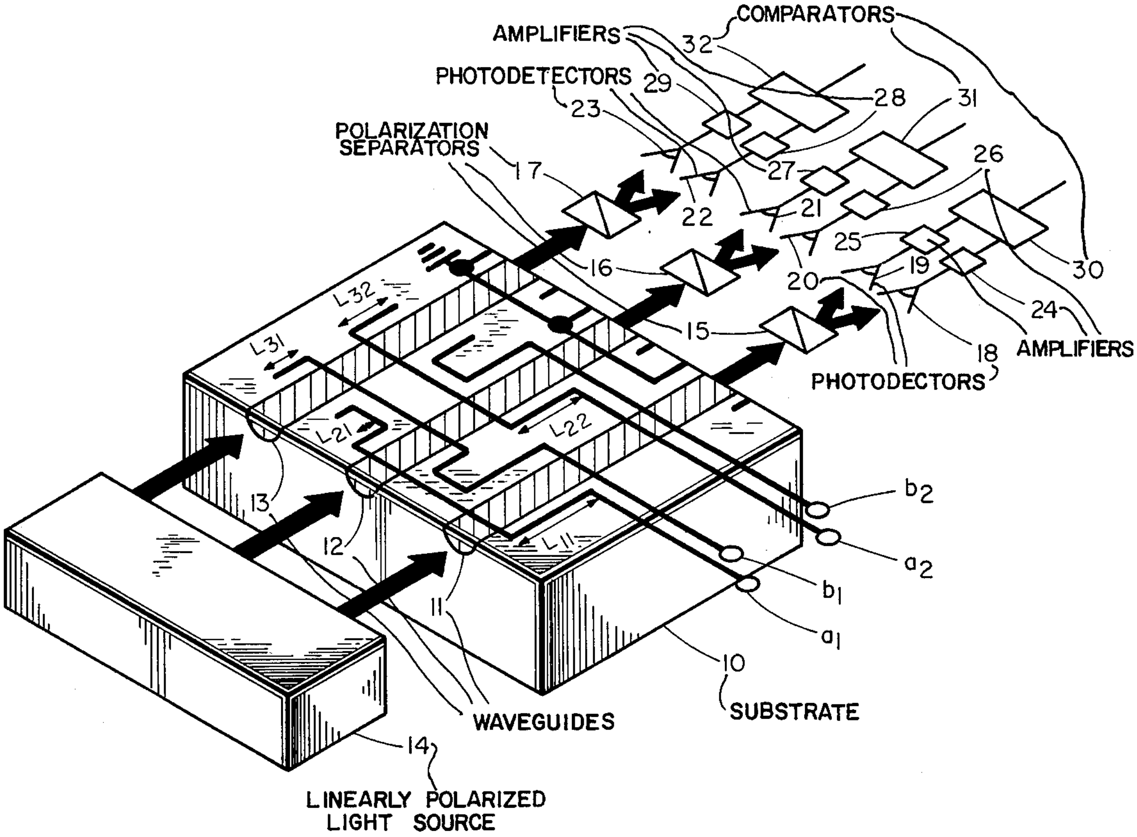
FIG. 1 is a partially perspective pictorial, partially schematic representation of an embodiment of the present invention.

An electro-optic arrangement for implementing the above relationships is illustrated in FIG. 1. An electrically non-conductive substrate 10 supports a plurality of optical waveguides 11, 12, and 13. In a preferred embodiment of the present invention the substrate 10 may be comprised of lithium niobate and the optical waveguides 11, 12 and 13 may be provided by the diffusion of titanium into the substrate 10. The waveguides 11, 12, and 13 are characterized as being of electro-optic material which exhibits linear change of refractive index in response to an electric field impressed thereacross. In accordance wih the concept and teaching of the present invention, the waveguides 11, 12, and 13 must be one more in number than the number of bits in the addends to be summed. Thus, if addends of two bits are to be summed, three optical waveguides will be provided as shown in FIG. 1.

A source of linearly polarized light 14 such as a suitable continous wave laser is adapted to transmit its output light energy along each of the plurality of waveguides 11, 12 and 13 as schematically represented by the heavy arrows of FIG. 1.

A plurality of electrodes are disposed so as to provide discrete lengths L, each contiguous to one of the plurality of waveguides for impressing an electric field thereacross, the number of bits of electric fields being equal to the number of bits in the addends to be summed. The exact lengths L may be calculated and predetermined as will be explained more fully hereinafter.

Polarization separators 15, 16 and 17 are provided to receive the phase retarded outputs of the respective waveguides 11, 12 and 13 and produce outputs having amplitudes commensurate with the orthogonally polarized components of the received light energy. Photo detectors 18 and 19 receive the orthogonally polarized component outputs of the polarization separator 15; photo detectors 20 and 21 receive the orthogonally polarized component outputs of the polarization separator 16; and, photo detectors 22 and 23 receive the orthogonally polarized component outputs of the polarization separators 17.

The photo detectors 18 through 23 generate a plurality of electrical signals, each of which is representative of one orthogonally polarized component. The photo detector output signals may be suitably amplified in amplifiers 24 through 29. A pair of amplified electrical signals associated with each waveguide is received by each of the analog comparators 30, 31 and 32. Each of the analog comparators 30, 31, and 32 produces a binary output signal representative of the relative amplitudes of the amplifed electrical signals derived from the orthogonally polarized components of light energy output of a respectively associated waveguides 11, 12 and 13. The binary output signals produced by the analog comparators 30, 31, and 32 compositely represent the binary sum of the input signals to terminals A1, and A2 and B1 and B2 as shown in FIG. 1.

In operation, for example, if $A = 10$ and $B = 11$ (in binary notation), then, from eqn. 1, $\zeta_1 = 1$, $\zeta_2 = 5/2$, $\zeta_3 = 5/4$, and, from eqn. 2, $C = 101$.

The electro-optic adder of the present invention implements this relationship. The array of channel waveguides which may preferably be identical as illustrated in FIG. 1 may be fabricated by diffusion in a single crystal substrate of a linear electro-optic material i.e., of Pockels type. Each waveguide is capable of propagating single mode light energy is excited by linearly polarized light from a suitably continous wave laser source; electro-optic phase retardation is induced in the waveguides by voltages applied to the electrodes on the surface of the substrate.

Each of the total of 2N electrodes corresponds to a particular binary digit in one of the addends to be summed. The magnitude of the voltage applied to an electrode is 0 (ground potential) for binary 0 and $V_0$ for binary 1; the sign of the voltage is such that the electro-optic phase changes in a particular waveguide have the same sense i.e., they are additive.

The electrodes are arranged so the lengths of the electro-optic interaction region corresponding to the input digits $A_n$ or $B_n$ in the $j$th waveguide, $L_{jn}$ is given by $$L_{jn} = 2^{n-j} 1_\pi, \text{ when } n \leqq j$$

$$l = 0 \text{ when } n > j$$

where $1_\pi$ is the length required for a pi-radian phase retardation in the waveguides with an applied voltage $V_o$. The total phase retardation for the jth waveguide, $\Delta\Gamma_j$ is therefore given by $$\Delta\Gamma_j = \pi \sum_{n=1}^{j} (a_n + b_n)2^{n-j} = \pi\zeta_j \tag{3}$$

The light emerging from each of the waveguides 11, 12 and 13 is then passed through an associated polarization separator such as those shown at 15, 16 and 17 which may comprise a Rochon or Wollaston prism. The individual intensities of the orthogonally polarized components thus separated may be detected independently by suitable photo detectors 18 to 23. The intensities of the orthogonally polarized components thus detected may be expressed as $$\left.\begin{aligned} I_{j\alpha} &= I_j\cos^2(\Delta\Gamma_j/2 + \Psi_j/2) + Q_j \\ I_{j\beta} &= I_j\sin^2(\Delta\Gamma_j/2 + \Psi_j/2) + R_j \end{aligned}\right\} \tag{4}$$

where $\psi_j$ is a static phase shift, which can be adjusted by a d.c. bias $V_{Dj}$, $I_j$ is the modulation amplitude and $Q_j$ and $R_j$ are d.c. terms which can be removed from the detector signals by filtering or subtraction.

Figure 2:
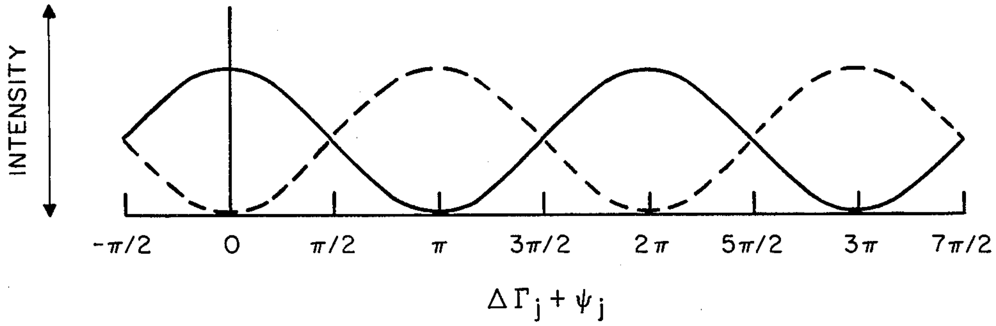
FIG. 2 is a graphical representation of the dependence of the intensities of orthogonally polarized light output from the device of the present invention in the $j$th waveguide on total phase retardation.

The outputs $I_{j\alpha}$ and $I_{j\beta}$ may be graphically illustrated as a function of the total phase shift $\Delta\Gamma_j + \psi_j$ as illustrated in FIG. 2. Modulation amplitude may be maximized in an embodiment of the present invention as illustrated in FIG. 1 by independently adjusting the orientation of the polarization separators and of the polarization vector of the incident beam in each waveguide.

A binary representation of the sum C is obtained by electronically comparing the intensities $I_{j\alpha}$ and $I_{j\beta}$, and generating a "zero" for the $j$th bit if $I_{j\alpha} > I_{j\beta}$ and a "one" if $I_{j\beta} > I_{j\alpha}$. From equations 3 and 4, the value of the $j$th bit is found to be $$\left.\begin{aligned} C_j = 0 \quad & \text{if } -\frac{1}{2} - \frac{\psi_j}{\pi} < \zeta_j < \frac{1}{2} - \frac{\psi_j}{\pi} \\ & \text{or } \frac{3}{2} - \frac{\psi_j}{\pi} < \zeta_j < \frac{5}{2} - \frac{\psi_j}{\pi} \\ C_j = 1 \quad & \text{otherwise} \end{aligned}\right\} \tag{5}$$

Since the $\zeta_j$s can assume only certain discrete values, there is some flexibility in the choice of the static phase shifts. For example, the only possible values for $\zeta_1$ are 0, 1, and 2, so that the result from equation 5 is consistent with equation 1 if $$-\pi/2 < \psi_1 < \pi/2.$$

As a practical matter, the $\psi_j$s should be chosen to minimize comparator errors, which are likely to occur if $I_{j\alpha}I_{j\beta}$, i.e., for $\Delta\Gamma_j + \psi_j \simeq (2m - 1)\pi/2$, $m = 0, 1, 2, \ldots$ From this standpoint, the best choice for the static phase shifts is $\psi_1 = 0, \psi_2 = -\pi/4$, $\psi_3 = -3\pi/8$, and, in general, $$\psi_j = \pi(2^{1-j} - 1)/2 \qquad j = 1, 2, \tag{6}$$

With $\psi_j$ given by equation 5, the minimum separation from the crossings of FIG. 2, in terms of phase shift, is expressed by the inequality $$|\Delta\Gamma_j + \psi_j = (2m - l)\pi/2 > \pi/2^j \qquad m = 0, 1, 2,$$

Assuming total extinction can be obtained in the modulator, the decision to generate a one or zero for the $j$th bit is based on a minimum intensity difference of $$|I_{j\alpha} - I_{j\beta}| \geqq I_j \sin(\pi/2^j)$$

An essential feature of the electro-optic modulation which makes the electro-optic adder of the present invention feasible is the periodic dependence of the intensities of polarization components on the induced phase retardation.

The speed of operation of the electro-optic binary adder of the present invention may be limited by the electronic comparator rather than by the electro-optic components. It has been demonstrated that optical waveguide modulators of $LiTaO_3$ have been operated at frequencies up to 1GHz as reported by investigators in that specific art.

Moreover, present photo multiplier and avalanche diode detectors will respond in the same frequency range. The fastest presently available commercial analog comparators using emitter coupled logic operate at frequencies to about the 250MHz range.

The number of bits of precision N for parallel addition is limited by considerations such as quantum noise in the detected signals and comparator overdrive requirements. High efficiency may be obtained however, at the cost of introducing sequential logic separating the addends into groups of N bits and providing for carry ripple through. Pipelining and carry-save addition techniques for obtaining both high precision and high throughput can also be readily implemented within the concept and teaching of the present invention.

Regardless, however, of the particular specific implementation of the teaching and concept of the present invention, fewer serial operations are required than in conventional electronic adders thus representing a significant and most important improvement over the prior art conventional electronic adders in which the minimum number of sequential operations is of the order of four or five for a single bit addends and increases significantly as a function of the increased number of bits in the addends.

Obviously many modifications and variations of the present invention are possible in the light of the above teachings. It is therefore to be understood that within the scope of the appended claims the invention may be practiced otherwise than as specifically described.

What is claimed is:

1. An electro-optic adder for summing binary addends having N bits comprising:

an electrically non-conductive substrate;

N + 1 optical waveguides supported by said substrate, said waveguides being of electro-optic material exhibiting linear change of refractive index in response to an electric field impressed thereacross;

a source of linearly polarized light adapted to transmit its output light energy along each of said waveguides;

a plurality of electrodes connectable to a source of electrical potential representative of a binary bit and having discrete lengths L contiguous to said waveguides for impressing electric fields thereacross, said lengths L in the jth waveguide corresponding to the nth bit in each addend being determined by the relationship $$L_{jn} = 2^{n-j} 1_{\pi}, \text{ when } n \leqq j, \text{ and}$$

$$L = 0, \text{ when } n > j$$

where $1_{\pi}$ is the length required for a pi-radian phase retardation of light propagation in the waveguides upon application of said electrical potential;

a polarization separator receiving the output of each waveguide for producing signals commensurate with the orthogonally polarized components of said output;

a photodetector responsive to each of said signals representing said components for producing an electrical signal representative thereof;

means for amplifying each said electrical signal; and an analog comparator for receiving the amplified electric signals derived from the orthogonally polarized components of light energy output of each of said waveguides for producing a binary output signal representative of the relative amplitudes of its received signals.

2. An electro-optic adder as claimed in claim 1 wherein said optical waveguides are identical channel waveguides.

3. An electro-optic adder as claimed in claim 1 wherein said optical waveguides are defined by an electro-optic material diffused into said substrate.

4. An electro-optic adder as claimed in claim 1 wherein said electrodes contiguous to said waveguides diminish in graduated lengths L relative to said optical waveguides in an order determined by the significance of each bit in each addend, beginning with the greatest length associated with the least significant bit.

5. An electro-optic adder as claimed in claim 1 including a source of electrical potential representative of a binary "one."

6. An electro-optic adder as claimed in claim 1 wherein said waveguides support a single mode of light propagation.

7. An electro-optic adder as claimed in claim 1 wherein said electrodes comprise electrically conductive material deposited on said substrate.

8. An electro-optic adder as claimed in claim 1 wherein said substrate is lithium niobate.

9. An electro-optic adder as claimed in claim 8 wherein said waveguides are comprised of titanium diffused into said lithium niobate.

* * * * *